(12) United States Patent
Phan Le

(10) Patent No.: US 8,822,903 B2
(45) Date of Patent: Sep. 2, 2014

(54) DETECTION SYSTEM FOR THE DETECTION OF MOVEMENTS OF A MOVABLE OBJECT, A METHOD OF DETECTING MOVEMENTS OF A MOVABLE OBJECT, AND AN IC HAVING IMPLEMENTED THEREIN THE DETECTION SYSTEM

(75) Inventor: Kim Phan Le, Eindhoven (NL)

(73) Assignee: NXP, B.V., Eindhoven (NL)

( * ) Notice: Subject to any disclaimer, the term of this patent is extended or adjusted under 35 U.S.C. 154(b) by 724 days.

(21) Appl. No.: 13/120,212

(22) PCT Filed: Sep. 16, 2009

(86) PCT No.: PCT/IB2009/054036
§ 371 (c)(1),
(2), (4) Date: Mar. 22, 2011

(87) PCT Pub. No.: WO2010/035170
PCT Pub. Date: Apr. 1, 2010

(65) Prior Publication Data
US 2011/0168874 A1    Jul. 14, 2011

(30) Foreign Application Priority Data

Sep. 23, 2008   (EP) ..................................... 08164880

(51) Int. Cl.
*G06F 3/033* (2013.01)
*G06F 3/042* (2006.01)
(Continued)

(52) U.S. Cl.
CPC .............. *G01S 7/4811* (2013.01); *G06F 3/0304* (2013.01); *G06F 3/03548* (2013.01); *G06F 3/0338* (2013.01); *G01S 17/88* (2013.01); *G01S 7/4813* (2013.01)
USPC ...................... 250/221; 250/208.4; 250/208.6; 341/31; 345/166; 345/175; 345/184

(58) Field of Classification Search
CPC ......... G01S 17/02; G01S 17/50; G01S 17/88; G01S 7/48; G01S 7/4817; G01S 7/4811; G01S 7/4812; G01S 7/4813; G06F 3/0304; G06F 3/033; G06F 3/0338; G06F 3/0354; G06F 3/03548; G06F 3/0362; G06F 3/042; G06F 3/0421
USPC ............. 250/221, 222.1, 208.2, 208.4, 208.6; 345/156, 157, 158, 161, 163, 165, 166, 345/167, 173, 175, 184; 341/20, 31
See application file for complete search history.

(56) References Cited

U.S. PATENT DOCUMENTS 5,999,166 A    12/1999 Rangan
(Continued)

FOREIGN PATENT DOCUMENTS

GB    2 258 043 A    1/1993
(Continued)

OTHER PUBLICATIONS

International Search Report and Written Opinion for Int'l. Patent Application No. PCT/IB2009/054036 (Mar. 2, 2010).

*Primary Examiner* — John Lee

(57) ABSTRACT

The present invention relates to a detection system for the detection of movements of a movable object. The detection system may comprises: a light emitting device (S) for emitting light, a reflecting unit (5) being arranged in functional connection with the movable object and being adapted for reflecting the emitted light, a plurality of detectors (D1 to D4) for detecting the reflected light and outputting detection signals for determining a movement of the movable object. When reflecting the emitted light, the reflecting unit causes a light spot to be incident on the plurality of detectors, and the plurality of detectors are arranged in a predetermined manner so as to be located completely inside the light spot irrespective of any movement of the movable object. The present invention further relates to a method of detecting movements of the movable object, and an IC having implemented therein the detection system.

16 Claims, 7 Drawing Sheets

(51) Int. Cl.
*G01S 7/48* (2006.01)
*G01S 17/88* (2006.01)
*G06F 3/03* (2006.01)
*G06F 3/0354* (2013.01)
*G01S 7/481* (2006.01)
*G06F 3/0338* (2013.01)

(56) References Cited

U.S. PATENT DOCUMENTS

| | | | |
|---|---|---|---|
| 6,081,255 A | 6/2000 | Narabu | |
| 6,326,948 B1 | 12/2001 | Kobachi et al. | |
| 7,528,330 B2 * | 5/2009 | Behrens | 200/5 R |
| 8,395,111 B2 * | 3/2013 | Phan Le | 250/231.13 |
| 8,508,511 B2 * | 8/2013 | Tanaka et al. | 345/184 |
| 8,558,162 B2 * | 10/2013 | Phan Le | 250/221 |
| 2001/0007449 A1 | 7/2001 | Kobachi et al. | |
| 2005/0213462 A1 * | 9/2005 | Maegawa | 369/59.11 |
| 2009/0073119 A1 * | 3/2009 | Phan Le et al. | 345/161 |
| 2009/0101802 A1 * | 4/2009 | Phan Le et al. | 250/221 |
| 2009/0101803 A1 | 4/2009 | Phan | |
| 2009/0101804 A1 | 4/2009 | Phan | |
| 2009/0115748 A1 * | 5/2009 | Tanaka et al. | 345/184 |
| 2009/0231165 A1 * | 9/2009 | Phan Le | 341/20 |
| 2011/0031380 A1 | 2/2011 | Phan | |
| 2011/0168874 A1 * | 7/2011 | Phan Le | 250/208.6 |
| 2011/0170119 A1 * | 7/2011 | van Geloven et al. | 356/615 |
| 2011/0174959 A1 * | 7/2011 | Geloven et al. | 250/208.6 |
| 2011/0240836 A1 * | 10/2011 | Phan Le | 250/231.11 |
| 2012/0001860 A1 * | 1/2012 | Phan Le | 345/173 |
| 2013/0069875 A1 * | 3/2013 | Phan Le et al. | 345/161 |

FOREIGN PATENT DOCUMENTS

| | | |
|---|---|---|
| JP | 2007-080214 A | 3/2007 |
| WO | 98/10373 A1 | 3/1998 |
| WO | 2007/135590 A2 | 11/2007 |
| WO | 2010/020906 A1 | 2/2010 |

\* cited by examiner

DETECTION SYSTEM FOR THE DETECTION OF MOVEMENTS OF A MOVABLE OBJECT, A METHOD OF DETECTING MOVEMENTS OF A MOVABLE OBJECT, AND AN IC HAVING IMPLEMENTED THEREIN THE DETECTION SYSTEM

FIELD OF THE INVENTION

The present invention refers to a detection system, and in particular to a detection system for the detection of movements of a movable object, to a method of detecting movements of the movable object, and an IC having implemented therein the detection system.

BACKGROUND OF THE INVENTION

Recently, the market for mobile devices such as mobile phones, PDAs, has been growing enormously. The diversity in functionalities and user interface has also been increased.

Existing mobile devices usually have a display (for example a Liquid Crystal Display) including a cursor which is to be controlled. The control of the cursor on the display is often performed by a 5-way joystick, which contains five switches located under the dome of a knob which can be operated by the user for performing any desired movement of the cursor. By pressing the joystick up or down or to the left or right, one of the four switches is closed, and this causes a corresponding movement of the cursor on the display in steps to a desired direction or position. With this kind of joystick and the use of four of the five switches only control of the cursor in four directions is possible. The fifth switch is usually provided as a central switch and is used for the "click" function, which means that the user can operate a corresponding button associated to the fifth switch to select a certain item on a menu by clicking the knob of the joystick vertically to thereby close the fifth switch.

PDAs and mobile phones nowadays have increasingly larger displays, and the control menus of such devices become more and more complex. Some specific functions such as gaming, web browsing, navigation, etc. may need a more precise and, thus, a continuous control of the cursor rather than a stepped control. Moreover, the mobile devices in question must be compact, robust, must have low power consumption and also a low price. With the joystick for such a mobile device it should be possible to perform the press-to-select function (that is, the "click" function), which means that a certain item in the menu can be selected by simply pressing the knob vertically.

Prior art documents, such as reference U.S. Pat. No. 6,326,948, disclose analogue joysticks which are based on optical principles. A common way of signal detection of those devices is that they detect the movement of a light spot with respect to a corresponding photodetector configuration. More precisely, the detection is based on the difference in the light coverage of the light spot upon the photodetectors. In this way, the area encircling the photodetectors must be rather large, depending upon the geometry of the device parts.

The click function mentioned in reference U.S. Pat. No. 6,326,948 B1 uses an aperture in between a light source for providing illumination light and a mirror for reflecting the illumination light, and the aperture adds complication to the alignment of the device and is disadvantageous in view of the dimensions thereof. The click function can also be provided by using a separate set of detectors only for this function. Further details about the prior art briefly mentioned will be explained in detail hereinafter.

Regarding reference U.S. Pat. No. 6,326,948 B1, this document discloses an input device which consists of a base having a slide surface, a movable body which is slidable on the slide surface, a light-emitting element for emitting light, a reflective portion which is arranged on the movable body and which has a reflective surface for reflecting the light emitted by the light-emitting element, as well as a plurality of light receiving elements for receiving light which is reflected by the reflective portion.

More specifically, the light coming from the light emitting element is incident on the reflective portion and is reflected to create a light spot on the base. The light spot covers partly the light receiving elements. For operation by a user the movable body slidable on the slide surface has a recessed or hollow portion to be touched and operated by the user's finger. That is, during operation, the user puts his fingers on the movable body to which the reflective portion is fixed, and with the sliding movement of the movable body the reflective portion will slide on the slide surface and will make the light spot on the light receiving elements to move in a corresponding manner. The movement of the light spot will make some difference in the light coverage on the light receiving elements, so that as a result different signals can be observed at the output of the light receiving elements. By means of a subtraction method the signals corresponding to the movement of the movable body and, thus, of the reflective portion in the X-Y-plane can be obtained.

The input device according to reference U.S. Pat. No. 6,326,948 B1 further includes an elastic structure in conjunction with the movable body (which is slidable on the slide surface), so that a movement perpendicular to the X and Y plane is possible and, thus, a detection in the Z-axis can be performed.

A corresponding situation is shown in FIG. 6 depicting the arrangement of the light receiving elements PD1 to PD4 and the light emitting element located in the central portion of this arrangement.

Regarding the detection of a movement of the reflective portion in the X-Y-plane, it is to be noted that the light spot created on the light receiving elements (photodetectors) by the light emitting element and the reflective surface on the movable body has a distinct boundary, and the boundary of the light spot needs to run across the light receiving elements PD1 to PD4 during the operation corresponding to a movement of the user's finger with the slidingly supported movable body. It is hereby supposed that the irradiance of the light spot is homogeneous over the entire area of the light spot. Specifically, the dimensions of the light spot are limited according to the following inequality:

$$d \leq x \leq 2r + 2l\text{max}, \tag{1}$$

in which d is the distance between two adjacent light receiving elements, x is the diameter of the light spot, r is the radius of the circle encircling the plurality of the light receiving elements, and lmax is the maximum movement distance of the movable body from the center.

The above inequality can be interpreted in the following way. Due to the reflection rule the maximum movement distance of the light spot on the base from the center is lmax'=2 lmax. Hence, inequality (1) can be rewritten as $$d \leq x \leq 2r + l\text{max}' \tag{2}$$

According to these considerations, the light spot diameter should be sized in such a way that the border of the light spot sweeps over the light receiving element areas covering the light receiving elements PD1 to PD4 when the movable body and in conjunction therewith the reflective portion moves during operation by the user. The inequalities (1) and (2) also imply that the light spot at the initial portion should cover partly the light receiving element areas, as is shown in FIG. 7. That is, the light spot covering partly the light receiving element areas and representing the initial position is represented by a dashed circle, whereas during operation, when the reflective portion slidingly moves, the boundary of the light spot should sweep across the light receiving elements (represented by a solid line circle in FIG. 7. The corresponding movement has, for example, been caused by the user in the X-direction, that is, to the right-hand side in FIG. 7.

The restriction according to the inequalities (1) and (2) has some disadvantages.

On the one hand, the inequalities (1) and (2) imply that the size of the area of the base B which contains the plurality of light receiving elements PD1 to PD4 should be larger than the light spot. However, the size of the light spot which is guided by the reflective portion is determined by the reflector size and also the size of the light emitting element. Because those sizes cannot be made very small (or it is at least difficult or costly to make it small), the light spot size cannot be small, and this leads to a minimum size requirement for the substrate (base B) that contains the light receiving elements PD1 to PD4. Consequently, it is difficult to miniaturize the device, and the cost of the device is high due to the large sized substrate.

On the other hand, based on the inequalities (1) and (2), the size of the light receiving elements W (FIG. 6, the size indicated in light receiving element PD2) should be larger than a certain value which depends on the other geometries in order to ensure the proper operation:

$$w \geq x/(2\sqrt{2}) - d/2 - l\max'/(2\sqrt{2}) \quad (3)$$

wherein the dimension of d which represents the distance between the edge of two light receiving elements is shown in FIG. 6.

It is further to be noted that the above condition is not related to the minimum area needed for each light receiving elements PD1 to PD4 to get a readable electrical signal. Inequality (3) has been derived from inequality (1) and from the relation between d, W and r in FIG. 6.

Consequently, the substrate area in between the light receiving elements PD1 to PD4 cannot be maximized for other purposes like integration of electronics for control and signal processing.

For the detection of the Z-direction, which corresponds to the "click" function (also called the press-to-select function), the user of the input device can press the joystick vertically to chose a certain desired item on the display. In this case, the detection of a movement in the Z-direction can be performed by using the aperture which is located in between the reflector R and the light emitting element LD. This is shown in FIG. 8.

When the user intends to operate the click function the user vertically presses the elastic structure of the movable object such as a button so that the reflecting portion for reflecting the light of the light emitting element follows the vertical movement, and as a result the light spot size will increase which makes the total signal to increase, and on the basis of this modification of the light spot size the pressing action can be detected. A corresponding situation is shown in FIG. 8.

It is to be noted that this principle has some disadvantages. The use of the aperture makes the construction of the device more complicated and increases the dimensions thereof. The use of the aperture makes it necessary to align the aperture very well with respect to the reflector and the other elements of the input device which makes a proper setting of a total device more complicated. Furthermore, the aperture constitutes an additional component of the input device which will cause higher manufacturing and assembling costs.

In conventional input devices joysticks may basically have the principle according to reference U.S. Pat. No. 6,326,948 B1, but some modifications may be provided.

During operation, that is, under a force from the user's finger, the reflecting portion (reflector) may tilt a few degrees around a fixed rotation point, rather than sliding on the sliding surface of the movable body. This would cause an additional change in the size and position of the light spot and, thus, an additional change in the signal which is used for further data evaluation of the joystick movement.

Moreover, in a similar manner as in the reference discussed above, the size of the reflecting portion R, the distance between the light emitting element LD and the reflecting portion R, and the dimensions of the detectors PD1 to PD4 may be chosen such that the light spot LS covers approximately half of the area of the detecting elements PD1 to PD4, the arrangement of which is shown in FIG. 9 having Figure portions 9a and 9b.

The principle is also based on the movement of the boundary of the light spot LS across the area of the light receiving elements. A disadvantage may occur in that the area which contains the light receiving elements cannot be made small, and the length of the light receiving elements in the radial direction cannot be made short and should depend on the geometry of the other components of the joystick.

At least the light receiving elements PD1 to PD4 and the corresponding electronics (electronic devices for data evaluation) can be integrated on a same substrate, such as a Si-substrate. The light emitting element LD which functions as the light source can be integrated on the same substrate, or can be mounted on the substrate as a separately manufactured component. The device can therefore have more degree of integration. The arrangements of the light receiving elements according to reference U.S. Pat. No. 6,326,948 B1 are discrete components mounted or molded on the base B.

In an alternative approach the light receiving elements can be divided up into a plurality of small elements so that a "discrete" way of detecting the signal can be used.

The detection of an operation in the Z-direction which corresponds to the click function can be done by having a plurality of light receiving elements which are always located inside the light spot. These light receiving elements are exclusively used for the detection in the Z-direction but not for any detections in the X- and Y-directions. Many ways of constructing the devices can be considered, such as based on Si photodiodes using CMOS, integrated with electronics, light emitting elements (light source) using light emitting diodes LED die or OLED, LTPS photodiodes with OLED light source, the light source being made from avalanche effect in CMOS circuit, etc.

SUMMARY OF THE INVENTION

It is therefore an object of the present invention, to provide a detection system for the detection of movements of a movable object, a method of detecting movements of the movable object as well as an IC having implemented therein the detection system, which allows further reduction of the size of the components and a reduction of the number of components, without degrading the detection performance and operation of the detection system.

According to the present invention, this object is accomplished by a detection system, a method of detecting movements of the movable object, and an IC having implemented therein the detection system, as set out in the appended claims.

In more detail, the detection system for the detection of movements of a movable object according to one aspect of the present invention comprises: a light emitting device for emitting light, a reflecting unit being arranged in functional connection with the movable object and being adapted for reflecting the emitted light, a plurality of detectors for detecting the reflected light and outputting detection signals for determining a movement of the movable object, wherein the reflecting unit, when reflecting the emitted light, causes a light spot to be incident on the plurality of detectors, and the plurality of detectors are arranged in a predetermined manner to be located completely inside the light spot irrespective of any movement of the movable object.

According to the present invention and specifically in conjunction with the appended claims, the principle of any detection in the X- and Y-directions is not anymore based on the movement of the light spot boundary across the detector areas, as in the references, but is based on the asymmetry in the irradiance profile of the light spot when the reflecting portion is tilted. Therefore, the detectors (light receiving elements) should always be located well inside the light spot irrespective of any movement of the movable object, and the size of the detectors can be made much smaller as long as the electrical signal obtained from there is still readable. This principle will result in a significantly smaller substrate area which contains the plurality of detectors, and also the size of the detectors can be minimized. Consequently, the area on a common substrate outside the detectors can be maximized for integration of the control and the processing electronics for data evaluation, and as a result, the overall substrate area (that is, the Si die area) can be minimized so that the costs of the entire device can be reduced. The size of the entire device is also reduced while the performance is still maintained to have a highly reliable output.

Moreover, the detection in the Z-direction which corresponds to the click function is based on a different principle than in the references. By contrast, according to the present invention, there is no need of any aperture in the middle of the light beam, and the joystick according to the present invention for the detection in the Z-direction makes use of the same set of the plurality of detectors provided for any detection in the X- and Y-directions.

Preferred embodiments of the present invention are defined in the dependent claims.

That is, the plural detectors may be symmetrically arranged around the light emitting device, and the reflecting unit may be arranged with a predetermined distance above the light emitting device directing the light spot to each of the plurality of detectors.

The plural detectors and the light emitting device may be arranged in or at a substrate, and the reflecting unit may cause the light spot to be incident on a predetermined area on the substrate covering the plurality of detectors.

The movable object can be a knob which can be elastically supported for a tilt or linear movement, the tilt or linear movement causing a variation of an irradiance on the plural detectors while the predetermined area on the substrate is maintained.

The detection signals of the plurality of detectors may be communicated to a plurality of processing units for obtaining signals indicative of the movement of the movable object based on the variation of the irradiance on the plural detectors.

The plurality of detectors may include a first subset of detectors for the detection of a tilt movement of the movable object in a first direction, as well as a second subset of detectors for the detection of a tilt movement of the movable object in a second direction, and the detection of the tilt movement of the movable object may be performed based on a difference in the irradiance of the reflected light on the detectors within each subset of detectors.

The movement of the movable object may includes a linear movement in a third direction perpendicular to the first and the second directions, and the linear movement of the movable object in the third direction is detected based on the output signals of at least one of the first and the second subsets of detectors.

The light emitting device and the plurality of detectors may be integrated on a substrate, and the movement of the movable object may be determined depending upon a variation in the irradiance of the reflected light within the light spot on the plurality of detectors.

The light spot of the reflected light on the plurality of detectors can have a predetermined size which remains unchanged when the movable object is moved in the third direction, and the light spot of the reflected light may include a predetermined irradiance profile, and the determination of the movement of the movable object may be based on an asymmetry of the irradiance profile of the light spot on the plurality of detectors due to the movement.

The light emitting device may be located at the center of the substrate and the plural detectors may be located symmetrically around the light emitting device.

The processing units may include differential circuits for detecting differences in the output signals of the plurality of detectors and for outputting a differential signal indicative of the movement of the movable object.

The light spot of the reflected light may have an outline shape according to one of a circular area, a square and a square with rounded corners.

The movement of the movable object in the third direction may be determined depending upon a variation in the irradiance of the reflected light within the light spot on at least one of the first and the second subsets of detectors.

The present invention according to a further aspect concerns an integrated circuit having implemented therein the detection system for detecting the movements of the movable object.

The present invention according to a still further aspect concerns a method of detecting movements of a movable object of a detection system. The method comprises the steps of: emitting light to a reflecting unit, reflecting the emitted light by the reflecting unit being arranged in functional connection with the movable object, causing a light spot to be incident on a plurality of detectors being arranged in a predetermined manner to be located completely inside the light spot irrespective of any movement of the movable object, and detecting the reflected light and outputting detection signals for determining the movements of the movable object.

The present invention is further elucidated by the following Figures and examples described in detail hereinafter, which are not intended to limit the scope of the invention. The person skilled in the art will understand that various embodiments may be combined without departing from the scope of the appended claims.

BRIEF DESCRIPTION OF THE DRAWINGS

The above object, avandtages and features together with numerous other object advantages and features will be apparent from and elicudated with reference to the embodiments of the present invention described hereinafter. In the following drawings

DETAILED DESCRIPTION OF THE DRAWINGS

Figure 1:
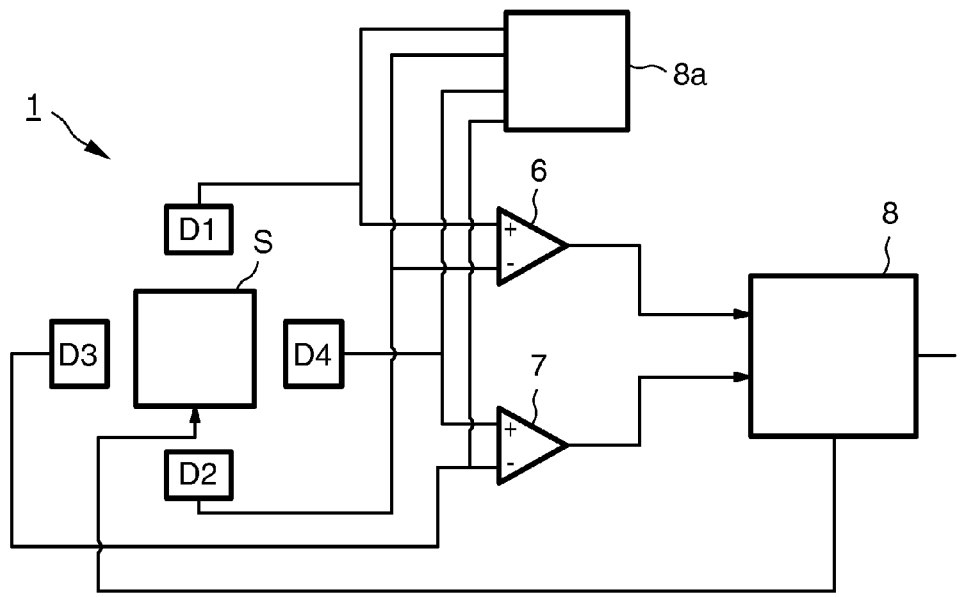
FIG. 1 shows an overall block representation of the circuitry of the detection system of the present invention.

FIG. 1 shows an overall configuration of the circuitry of the optical joystick (detection system) according to the present invention.

According to FIG. 1, a plurality of photosensitive devices such as light detectors (or photo detectors) hereinafter referred to as detectors D1 to D4 and having the function (sensing function) of a light receiving means is provided according to a predetermined arrangement. The arrangement of FIG. 1 shows, for example, the detectors D1 to D4, but the present invention is not limited to this number of detectors since any suitable number n of detectors D1 to Dn can be provided to obtain the function of the present invention. Each of the detectors D1 to D4 may be composed of a plurality of particular light sensitive elements, such as photo diodes or photo transistors. A light emitting element or light emitting means, hereinafter referred to as a light source S, is provided adjacent to the plural detectors D1 to D4, and is arranged for emitting a light which can be reflected by a reflecting unit 5 (not shown in FIG. 1, explained hereinafter) to obtain incident light on each of the plurality of detectors D1 to D4 by means of the reflecting unit 5. The light source S may be composed of a plurality of particular light emitting elements, such as LEDs.

A subset of the plurality of detectors D1 to D4, in the present case the first and second detectors D1 and D2 are connected to a first processing unit 6, arranged for a pre-processing of corresponding output signals generated by the respective first and second detectors D1 and D2.

In a similar manner a further subset of the plurality of detectors D1 to D4, and specifically the third and fourth detectors D3 and D4 are connected to a second processing unit 7 for providing a corresponding pre-processing of output signals of the respective subset of detectors (the detectors D3 and D4), as in the case of the first processing unit 6.

The pre-processed output signals of the plurality of detectors D1 to D4, and specifically the output signals of the first and second processing units 6 and 7 are communicated to a controller 8 having the function of a data evaluation and control means. The controller 8 is adapted for performing on the one hand the data evaluation on the basis of the pre-processed output signals of the plurality of detectors D1 to D4, and on the other hand to perform a control of the entire detection system. This includes the controlled driving of the light source S for emitting corresponding light.

The output signals of the plurality of detectors D1 to D4 are in addition communicated to a further controller 8a also having the function of a data evaluation and control means. The further controller 8a is adapted for performing the data evaluation on the basis of the output signals of the plurality of detectors D1 to D4. Specifically, based on the supply of the output signal of each of the plurality of detectors, a common signal is produced (by taking the sum of all signals), and a click signal (Z detection signal) is generated and then fed to the (central) controller 8.

The controller 8 may have a connection to any further device and corresponding control means thereof depending upon the device or apparatus to which the detection system is connected or which the detection system is applied to. According to the examples described in this specification the detection system according to the present invention is implemented as a joystick preferably of any movable device. It is in the following referred to the joystick 1, provided in the form of an optical joystick or may be part of any other pointing device for controlling a cursor on a display of portable devices.

FIG. 1 shows the circuit structure as general connections for transmitting and/or receiving data, as well as current and/or voltage signals between the various components of the circuitry shown.

Figure 2:
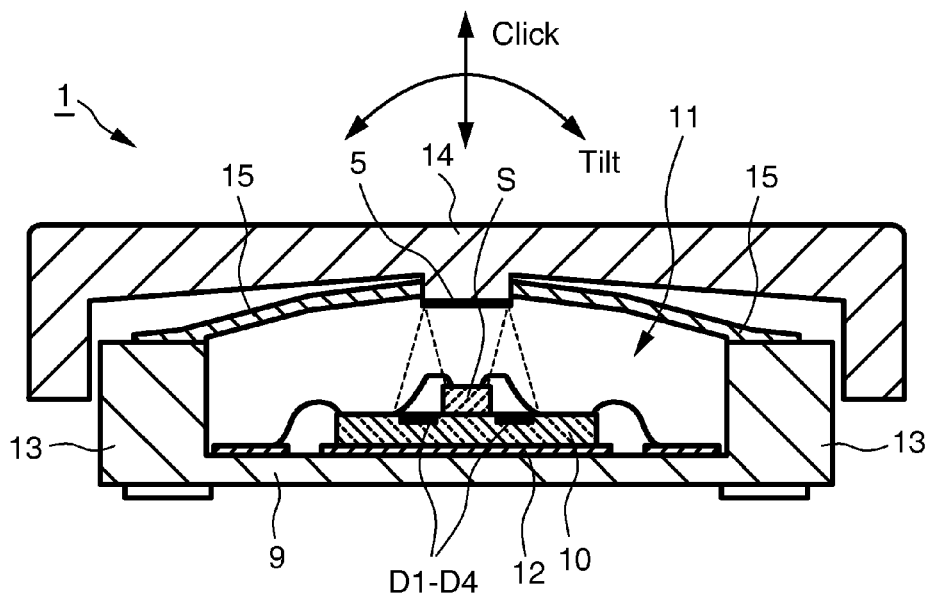
FIG. 2 shows a cross-sectional view of the arrangement of the detection system of the present invention.

While FIG. 1 shows the basic elements or components of the circuitry and hardware of the joystick, FIG. 2 shows the cross-sectional view of the arrangement of the joystick according to the present invention.

The cross-sectional view of FIG. 2 depicts a package (or casing) 9, wherein on a substrate 10 arranged in a cavity 11 of the package 9, the plurality of detectors (photosensitive elements, light receiving elements) D1 to D4 is arranged or embedded. The substrate is fixed to the package 9, preferably in the central portion in the cavity 11 thereof by means of a metal layer 12.

The light source S schematically shown in FIG. 1, is arranged on the substrate 10 preferably but not necessarily at a central portion thereof as a separate component, or may be embedded in the substrate 10, to emit light basically in a direction upward in FIG. 2. While the light source S is preferably located at the central portion of the substrate 10 the plurality of detectors D1 to D4 is arranged around the light source S. The electrical connections between the package and the detectors D1 to D4 and the light source S are provided by bonding wires, and the electrical connections of the package to the outside can be ball-grid; SMD (surface mounted devices), etc., but also flexible connections are possible. The cavity 11 of the package extends above the light source S and the detectors D1 to D4 surrounded by sidewalls 13 of the package 9.

Hence, the substrate 10 in conjunction with the detectors D1 to D4, the light source S and the corresponding bonded connections is commonly housed inside the package, which may be provided in the form of an IC package. In this case the detection system is implemented in the IC package.

Alternatively, the substrate may be molded inside a transparent material which can also serve as an IC package while still light can go through the transparent material.

Above the light source S there is a touch surface on a movable object preferably provided in the form of a knob 14, which can be touched for operation of the joystick by the user. The knob 14 as shown in FIG. 2 basically constitutes a cover over the package 9 and the cavity 11 thereof, and may be movable to a certain extent relative to the package 9. To this end, the knob 14 is flexibly supported by a flexible suspension mechanism which is preferably provided in the form of a spring 15 which allows the knob 14 to tilt a few degrees around a virtual point when the force from a user's finger is applied. Due to the elastic support of the knob 14 on the package 9 by the spring 15 the knob can return to the central position or rest position when the force of the user's finger is removed, this corresponding to a released position of the knob 14 (movable object).

At the lower portion of the knob 14, basically on the surface thereof opposite to the cavity 11 of the package 9 a reflecting unit 5 is arranged in such a manner as to face the light source S. The reflecting unit 5 is therefore in a functional relationship or operational connection with the knob (movable object) 14 and may be provided in the form of a mirror which can have a symmetrical shape such as a square shape or a circular shape, and the reflecting unit 5 may be mounted basically at the central portion of the knob 14 which may be provided in the form of a protruding portion extending in a direction downward in FIG. 2 towards the substrate 10, and in particular towards the light source S. Hence, for obtaining the functional or operational connection to the knob 14 the reflecting unit 5 is mounted to the bottom of the knob 14, that is, the lower surface of the knob 14, whereas the upper surface of the knob 14 constitutes the touch surface for any operation by the user.

The spring 15 may be fabricated from metal or plastic material to provide the basically symmetrical suspension of the knob 14. Preferably, the spring 15 is fixed to the knob 14 close to the central portion thereof, that is, adjacent to the protruding portion for fixing the reflecting unit 5, while the other ends of the spring 15 are supported by the sidewalls 13 of the package.

The dimensions of the complete device are about a few millimeters, but can be larger if required.

It is to be noted that the shape and the construction of the spring 15, the shape and dimensions of the package 9 and the arrangement of the knob 14 are shown in FIG. 2 just as explanatory examples, and these components may be arranged or designed in a different suitable manner provided that a proper interaction with the further components of the joystick 1 is ensured. The plural detectors D1 to D4, the light source S and further components may be arranged in an integrated manner on the substrate 10 of the package 9, so that an on-chip solution can be obtained.

Figures 3A, 3B:
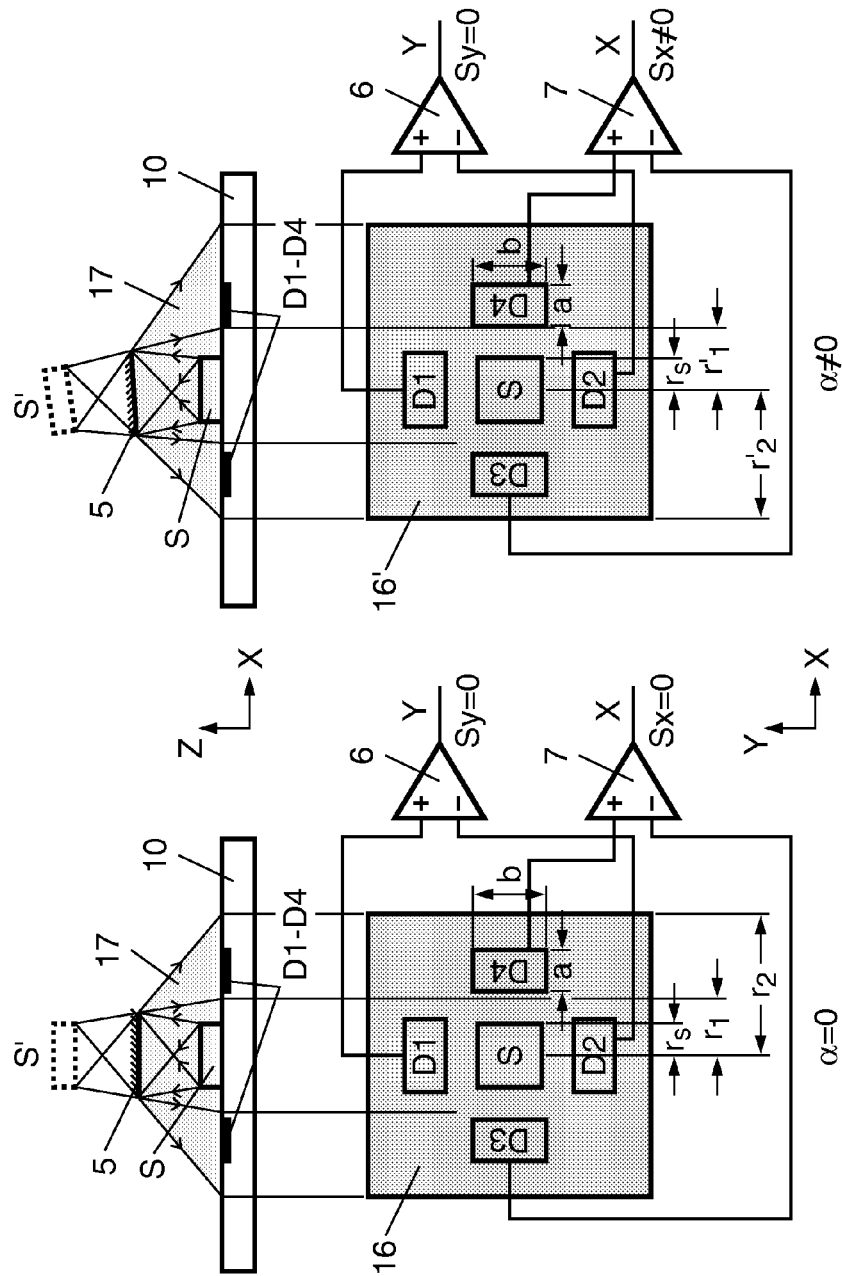
FIGS. 3a and 3b show cross-sectional view (top drawings) and top view (bottom drawings) of the detection system when the movable object is at the rest position, wherein the tilt angle is $\alpha=0$, and when the tilt angle is a few degrees.

According to a preferred arrangement of the present invention, there may be four detectors (photosensitive elements) D1 to D4 of any shape positioned symmetrically around the light source S. A corresponding arrangement is shown in FIGS. 3A and 3B, and the operation of the joystick 1 according to the present invention is now described in conjunction with the schematical view (cross-sectional view and plan view) of FIGS. 3$a$ and 3$b$.

Moreover, the knob 14 may be made of an elastic material having a certain compliance when pressed by the user's finger, or may be made of a rigid material.

The spring 15 for flexibly and movably supporting the knob 14 is arranged in such a manner that the knob 14 stands upright in a rest position (upper drawing in FIG. 3$a$) when no force is applied to the knob 14, that is, when the user no longer touches the knob 14 but has released the knob 14. When the knob 14 stands upright in the rest position the reflecting unit 5, which may be provided in the form of a mirror or any metalized plane, stands basically parallel to the substrate 10, and due to the reflecting unit's position facing the light source S, light emitted from the light source S is reflected by the reflecting unit 5 and causes a light spot 16 onto the substrate 10, and in particular on the plurality of detectors D1 to D4. This light spot 16 constitutes a predetermined area on the substrate 10 which is illuminated and which basically covers the plural detectors D1 to D4.

From the upper drawings of FIGS. 3$a$ and 3$b$, it can be considered that the image S' of the light source S behind the reflecting unit 5 shines a light cone 17 through an opening created by the outline (size) of the reflecting unit 5. The light spot 16 can have an outline shape of a square, a circle or a square with rounded corners, depending upon the shapes of the light source S and of the reflecting unit 5. Due to the preferred symmetry of the complete system of the joystick 1 the reflected light spot 16 is centered on the detector configuration (detectors D1 to D4). In other words, all detectors D1 to D4 in the case of FIG. 3$a$ basically receive an equal amount of light (the tilt angle of the knob $\alpha$=0). And the output signals of the respective detectors D1 to D4 are almost the same. Hence, reflected light of the light source S is almost continuously incident on the detectors D1 to D4 thereby acting as a constant background signal at all the plural detectors D1 to D4. This is considered in the present detection concept.

Since the detectors D1 to D4, as is shown in FIG. 1, are respectively connected to a first and a second processing units 6 and 7, which may be provided preferably in the form of two differential circuits (differential amplifiers), these first and second processing units 6 and 7 are arranged to generate output signals X and Y which correspond to the tilt of the knob 14 in the X and Y directions.

Hence, since according to the arrangement shown in FIG. 3$a$ and the corresponding position of the light spot 16 on the plurality of detectors D1 to D4 a basically equal output signal of all of the plurality of detectors D1 to D4 is obtained, the output signals in X and Y directions provided after pre-processing by the first and the second processing units 6 and 7 are zero. This indicates the rest position or untilted position of the knob 14 and the specific situation that no force is applied to the knob 14 and no operation is intended by the user.

It is to be noted that the arrangement of the present invention is not limited to the square outline of a light spot, as is shown in FIG. 3$a$ (bottom drawing), but different shapes of the light source S and the reflecting unit 5 can be used for obtaining the function of the present invention, and in this case different shapes of the light spot 16 and the outline thereof may occur. Hence, different shapes of the light source S, the reflecting unit and the light spot 16 do not influence the performance of the present invention.

While in FIG. 3$a$ the knob 14 has not been touched by the user so that the tilt angle $\alpha$=0, the tilt angle $\alpha$ of the knob 14 as shown in FIG. 3$b$ is not identical to zero ($\alpha \neq 0$), and this indicates that the joystick 1 according to the present invention is at least slightly tilted anticlockwise around a virtual pivot in the middle of the reflecting unit 5. The image S' of the light source S is moved along a circle to a new position arranged on the left hand side relative to the untilted position shown in FIG. 3$a$. The light cone 17 which is incident on the plurality of detectors D1 to D4 is therefore also tilted and consequently the light spot 16 is slightly displaced to the right (in the bottom drawing of FIG. 3$b$) and the light irradiance profile is no longer symmetric on the plurality of detectors D1 to D4. Since the symmetry of incident light on the plurality of detectors D1 to D4 is broken due to the tilted knob and, thus, the tilted reflecting unit 5, for example, the fourth detector D4 receives more light than the third detector D3, while the first and second detectors D1 and D2 still receive basically an equal amount of light.

Hence, when the output signals of the respective detectors D1 to D4 are fed to the corresponding first and second processing units 6 and 7 and are pre-processed preferably based on differential circuits, on the output X (second processing unit 7) a non-zero signal is detected which is proportional to the tilt angle of the reflecting unit 5 in the X-direction. Furthermore, the signal on the output Y of the first processing unit 6 remains zero due to the basically equal amount of light incident on this subset of detectors (first and second detectors D1 and D2).

Similarly, a tilt in any direction (X and Y directions) can be detected by performing a processing and data evaluation on the output signals of the plurality of detectors D1 to D4.

It is to be noted that the way of connecting the plurality of detectors D1 to D4 as shown in FIGS. 1 and 3 is merely an example, and there may be different ways to connect the detectors with plural processing units (such as the processing units 6 and 7) to extract the signals X and Y from the plurality of detectors, and in particular from the four detectors D1 to D4 according to the examples shown in FIGS. 1 and 3.

Regarding the arrangement shown in FIG. 2, the size of the reflecting unit 5, the distance between the light source S and the reflecting unit 5, and the dimensions of the plurality of detectors D1 to D4 should be chosen such that the detectors D1 to D4 lie totally inside the light spot in both the rest position and when the mirror is tilted with the designed maximum angle. The range of the tilt angle of the knob 14 and of the reflecting unit 5 fixed thereto is limited by the knob 14 touching one of the sidewalls 13 of the package 9 when tilted to the left side or right side in FIGS. 2 and 3. In FIG. 2 in the upper portion thereof arrows are shown to indicate the possibility of operating the knob 14 by the user. That is, the arc-shaped arrow with the inscription "tilt" indicates the tilting angle which can be applied on the knob 14 and which has a certain operation range.

In the following, the output signals of the first and second processing units 6 and 7 for the Y and X directions will be analyzed and discussed with respect to FIG. 4.

Figure 4:
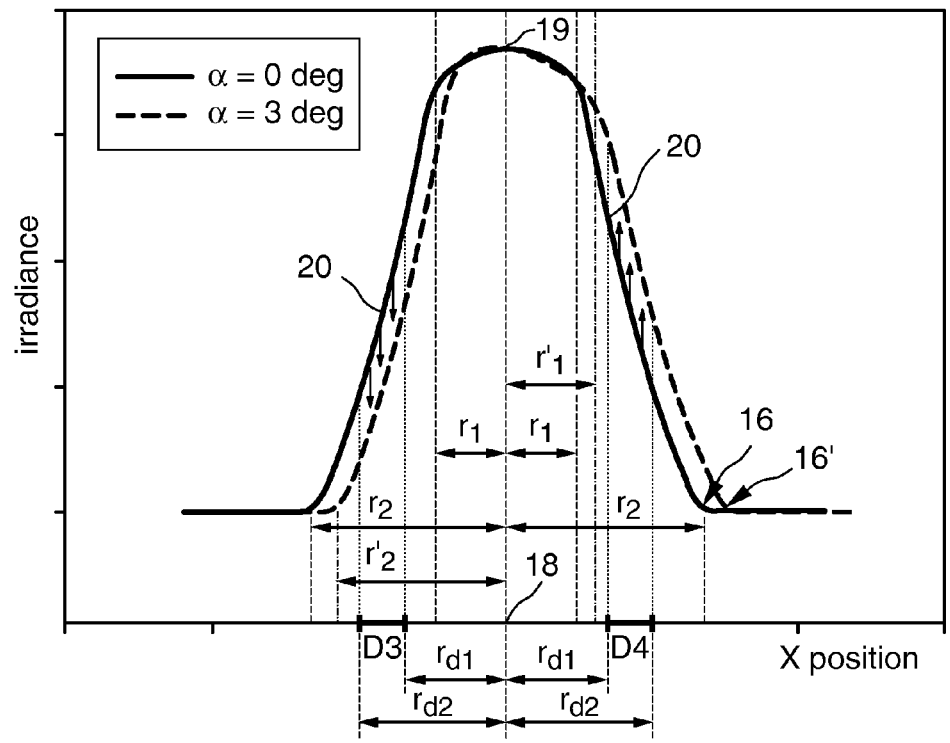
FIG. 4 shows a graphical representation of the irradiance profiles created by the light emitting device and reflected by the reflecting unit onto the substrate.

In detail, FIG. 4 presents calculated irradiance profiles taken along the X direction as shown in FIGS. 3a and 3b. The line according to which the irradiance profiles of FIG. 4 are taken, therefore, runs in the X direction and across a center point 18 of the light source S (as shown in FIGS. 3a and 3b).

In FIG. 4 the positions of the relevant subset of the detectors D1 to D4, and in the present case of the third and fourth detectors D3 and D4 are represented by the two short bars on the horizontal axis and being labeled D3 and D4. The distances of the inner edge and the outer edge of the respective detectors D3 and D4 from the center are represented by rd1 and rd2, respectively. It is apparent from FIGS. 3a and 3b that rd2−rd1=a.

When the reflecting unit 5 is at the rest position, i.e. the user of the joystick 1 does not touch the knob 14 and the tilt angle thereof is $\alpha=0$ deg, then the irradiance profile is symmetric as is shown by a solid line in FIG. 4.

From the irradiance profile of FIG. 4 it is obvious that the profile has two parts: the central top part (including maximum values 19) and "shoulders" 20. The boundary between these two parts is at a position r1 from the center 18 (which basically corresponds to the center of the light source S). The shoulder vanishes at position r2 from the center 18. Beyond the position r2 from the center 18, light irradiance is completely zero. Hence, the boundary of the light spot 16 is considered to be r2.

In conjunction with the irradiance profiles shown in FIG. 4 it is to be noted that the light spot 16 (see also FIGS. 3a and 3b) does not have a homogeneous irradiance profile, but has the predetermined distribution according to the curves of FIG. 4, basically resulting from the structure and dimensions of the mechanical arrangement shown in FIG. 1.

More specifically, the shape (distribution) of the profile as shown in FIG. 4 is attributed to a number of factors: the finite dimensions such as shape and structure of the light source (which is not a point source), the Lambertian rule of a flat light source, the difference in the light path, the difference in the angle of light ray emitted from the light source S and the difference in the angle of light incident on the substrate 10 in conjunction with the arrangement and structure of the reflecting unit 5, and on the arrangement of the respective detectors D1 to D4 forming the photo-sensitive light receiving elements.

The central top part 19 (FIG. 4) which is defined by r1 is the area where the substrate 10 is able to recognize the entire image S' of the light source S. The irradiance profile of this part is the superposition of the emitted rays from all points of the light source S at all emitting angles that fall on the reflecting unit 5. For one point on the light source S the profile follows the $\cos^4 \theta$ rule in which $\theta$ is the emitting angle of a ray emitted from that point.

The shoulder part 20 in between r1 and r2 is the area where the substrate 10 that includes the detectors D1 to D4, recognizes only a part of the image S' of the light source S. Further, the position from the center 18 on the substrate 10, less and less part of S' is recognized by the substrate 10 (detectors D1 to D4), and finally beyond r2 the image S' is completely outside the view on the reflecting unit 5. The shoulder 20 is the region where the irradiance varies the steepest.

Accordingly, the reflecting unit 5 specifically causes a symmetric irradiance profile relative to the centerline running through center 18, as can be seen from FIG. 4. The profile is slightly shifted over the detectors D1 to D4, when the movable object 14 in the form of a knob is tilted by the operation of a user so that the plural detectors D1 to D4 can identify or detect an asymmetry of the irradiance profile. However, irrespective of the shifting of the irradiance profile causing the light spot 16 or 16' on the substrate 10 covering the plurality of detectors D1 to D4 the plural detectors always lie within the light spot 16 (not shifted) or 16' (shifted), as shown in FIG. 4. Hence, the asymmetry of the irradiance profile is relative to a particular subset of the plurality of detectors D1 to D4, but in any case all the detectors D1 to D4 are provided with reflected light within the light spot 16 or 16'.

When the knob 14 and, thus, the reflecting unit 5 is tilted by an operation of the user, for example, to the left, as is shown in FIG. 3b, the profile is modified and specifically slightly deformed and becomes asymmetric relative to a centerline being perpendicular to the X direction and including the center 18 (corresponding to the center point of the light source S). The centerline is depicted in FIG. 4 as a dashed line. The light spot 16 may slightly vary in its size when the reflecting unit 5 is tilted.

Moreover, the asymmetric irradiance profile (relative to the center 18 and center line of FIG. 4) due to the slight tilting (few degrees) of the knob 14 and correspondingly of the reflecting unit 5 is shown as a dashed curve in FIG. 4 with a shifting relative to the solid line of the irradiance profile without the knob 14 being tilted. Regarding this asymmetric irradiance profile (dashed curve) in FIG. 4, both r1 and r2 move to new positions r1' and r2', and they are different from the left to the right (relative to a centerline or center 18).

Since the third and fourth detectors D3 and D4 are placed completely within a shifted light spot 16', i.e. inside r2 and r2', the irradiance of reflected light received by the subset of the detectors D3 and D4 will considerably change in opposite directions. In greater detail, in the present example depicted in FIG. 4, the third detector D3 receives less irradiance (a smaller amount of light, indicated by vertical arrows in the downward direction at the shoulder 20), and the fourth detector D4 receives more irradiance (a higher amount of light, depicted in FIG. 4 by vertical arrows in the upward direction at the shoulder 20), thus resulting in different signals output by these detectors D3 and D4.

Due to the different signals of the detectors D3 and D4 (subset) the second processing unit 7 receives these different signals and provides an output signal representative of the difference (see FIGS. 1 and 3).

The output signal of the second processing unit 7 (FIGS. 1 and 3) can be subject to any further data evaluation to obtain a corresponding information to indicate a desired cursor position on a display.

Regarding the arrangement of the detectors D1 to D4, as already stated above, the plural detectors are preferably located completely inside the light spot 16, when the reflecting unit 5 is at the rest position (tilt angle $\alpha=0$, knob 14 not touched by user), and when the knob 14 is fully touched by the user and is brought to the maximum tilted position (maximum tilt angle $\alpha$).

Accordingly, the following inequalities should be satisfied.

$rd2 \leq r2$ and $rd2 \leq r2$ min' in which r2min' is the minimum value for r2' when the reflecting unit is tilted at the designed maximum angle, which can either be on the left or on the right hand side depending upon the direction of tilt, i.e. depending upon the direction of the force exerted by the user on the knob 14.

It is even more preferred that the detectors D1 to D4 lie completely within the shoulder 20 (FIG. 4), for both the rest position and the maximum titled position (FIG. 4). Within the shoulder 20 of the irradiance profile the change in the irradiance is maximized and readily detectable, since the slope of the shoulder 20 is the steepest. That means the following inequalities should preferably be satisfied:

$rd2 \leq r2$ and $rd2 \leq r2$ min', and $rd1 \geq r1$ and $rd1 \geq r1$ max', in which r1max' is the maximum value of r1' when the mirror is tilted at the designed maximum angle, which can either be on the left or the right side of the centerline (center 18, FIG. 4) depending upon the direction of tilt, i.e. depending upon the direction of force exerted by the user touching and operating the knob 14.

The values r1, r2, r1max', r2min' can be defined from the following general expression for r.

$$r = (h_0 + h_L + r_{m0}\sin\alpha)\cot\left[\arctan\left\{\frac{h_0 + r_{m0}\sin\alpha}{r_{m0}\cos\alpha}\right\} - 2\alpha\right] + r_{m0}\cos\alpha + r_{s0};$$

in which hL is the height of the light source, i.e. the height of the radiation surface of the light source S above the general level of the substrate 10, h0, rm0 and rs0 are parameters which will be defined hereinafter.

Depending upon the cases 1 to 4 discussed below, r will become r1, r2, r1' or r2'.

Case 1:

$r=r1$ when $rm0=rm-rs/\cos\alpha$; $h0=h+rs\cdot\tan\alpha$; $rs0=rs$; and $\alpha=0$.

The tilt angle is zero and the knob 14 is not touched or tilted by the user.

Case 2:

$r=r1'$ when $rm0=rm-rs/\cos\alpha$; $h0=h+rs\cdot\tan\alpha$; $rs0=rs$; and $\alpha\neq0$, wherein h is the distance between the reflecting unit 5 and the surface of the light source S, rm is the radius of the reflecting unit 5 (if the reflecting unit 5 is provided in the form of a circular area, and when the reflecting unit 5 is provided in the form of a square, it is half of the side of the square), rs is the radius of the light source S (if the light source S is provided in the form of a circular area, and when the light source S is provided in the form of a square, it is half of the side of the square).

It is to be noted that r1max' is the maximum value of r1' when the reflecting unit 5 is tilted at the maximum designed angle $\alpha$.

Case 3:

$r=r2$ when $rm0=rm+rs/\cos\alpha$; $h0=h-rs\cdot\tan\alpha$; $rs0=-rs$; and $\alpha=0$.

In this case the tilt angle $\alpha$ is zero indicating that the knob 14 is not touched or tilted by the user.

Case 4:

$r=r'2$ when $rm0=rm+rs/\cos\alpha$; $h0=h-rs\cdot\tan\alpha$; $rs0=-rs$; and $\alpha\neq0$.

It is to be noted that r2min' is the minimum value of r2' when the reflecting unit 5 is tilted at the maximum designed angle $\alpha$.

The above inequalities, which are completely different from the detection concept mentioned in the above-discussed prior art documents, imply that there is no lower limit for the dimension of the plurality of detectors D1 to D4 having the function of the photo-sensitive light receiving elements. That is, in principle the detectors D1 to D4 can be provided in the form of a point device, that is, may have a minute detection area. In practice the actual area of the detectors (the photosensitive area) only depends on the required signal (signal strength) obtained from such detectors as it is known that the signal scales with the detector area. Moreover, the total area of the substrate 110 which encircles the plurality of detectors D1 to D4 can be kept significantly smaller than that described in the above references. Therefore, the area of the substrate 10 used for the plurality of detectors D1 to D4 can be minimized and the rest substrate area available for further integrated electronics can be maximized. Hence, the utilization of the total substrate area can be optimized.

It is in the following referred to the detection of any movement of the knob 14 (movable object) in the Z direction which corresponds to the click function, and this detection is now discussed in conjunction with the arrangements shown in FIG. 3a and the graphical representation of irradiance profiles shown in FIG. 5.

In general, the detection in the Z direction (Z detection) is used when the user operating the joystick 1 according to the present invention wants to select a certain desired item on the display after the cursor has been suitably positioned by means of the joystick 1 according to the above-described detection in the X and Y directions.

That is, in order to select a certain item on the display it is necessary for the user to move the cursor (by tilting the knob 14) to a desired location on the display, to release the knob 14 (so that the cursor stops moving and the knob 14 is no longer tilted), and to press the knob 14 vertically (downwards in the cross-sectional view of FIG. 2).

The elastical members in the form of spring 15 are designed in such a way that it has two stable positions: the click position (lower position) and the released position (higher position). On top of that, the knob 14 in conjunction with the spring 15 can still be tilted for modifying the X and Y detection function.

The click function is based on the phenomenon that when the reflecting unit 5 (when exerting a vertical force on the knob 14) travels closer to the substrate 10 (containing the plurality of detectors D1 to D4), the light path (length) becomes shorter so that the irradiance at any point on the substrate 10 being inversely proportional to the light path, is increased. On the other hand, the size of the light spot (that is, the value r2) basically remains unchanged.

The increase in the irradiance (the power of light radiation on a surface) is the same for all of the plurality of detectors D1 to D4, and accordingly the click action in the Z direction can be detected by using the signals (representing the sum of all signals) from all the plurality of detectors D1 to D4 or alternatively from a subset thereof. During this action, the differential signal remains unchanged.

Figure 5:
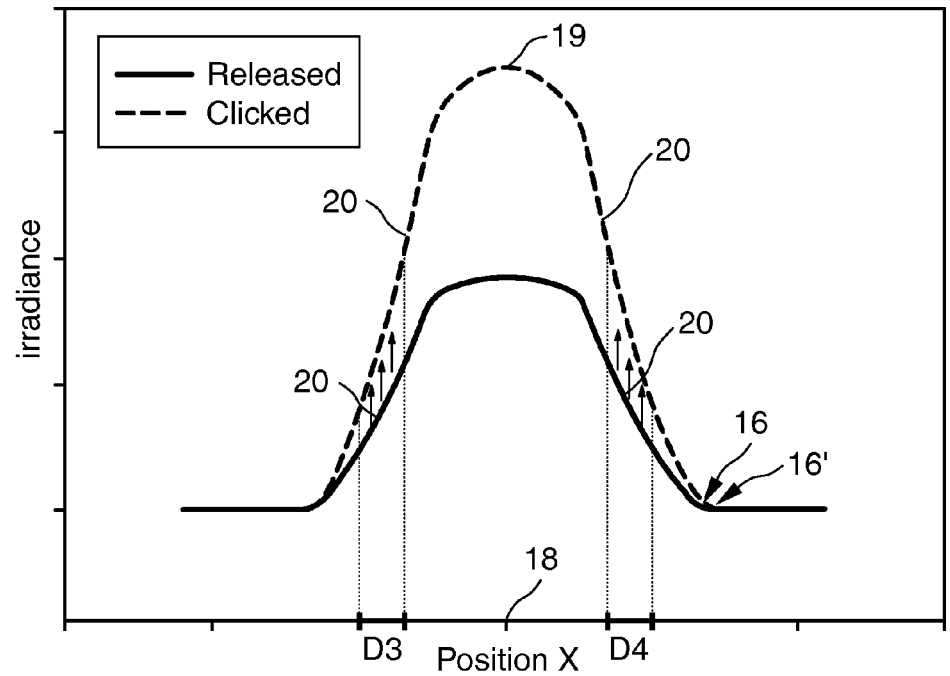
FIG. 5 shows calculated irradiance profiles of the released and of the click position.
Figure 6:
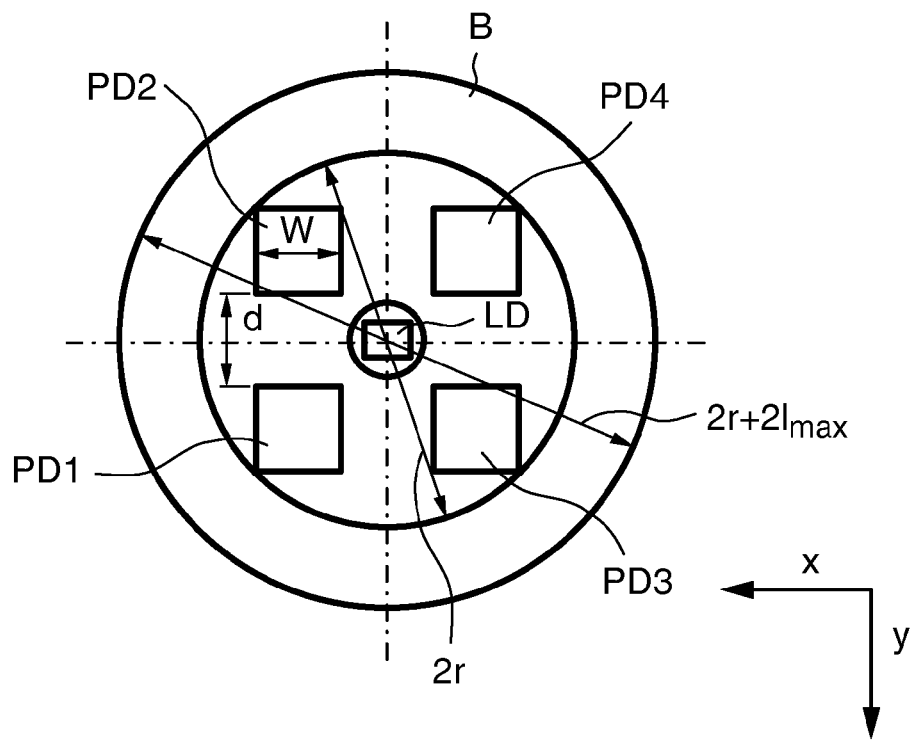
FIG. 6 shows a plan view of the conventional arrangement of plural light receiving elements and a light emitting element as well as the diameter of a light spot.
Figure 7:
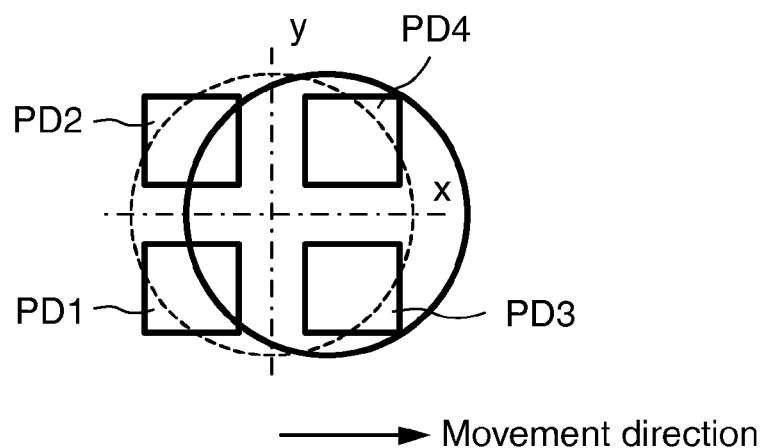
FIG. 7 shows the arrangement of the light receiving elements of FIG. 6 and the positions of a light spot according to an initial and a moved position.
Figure 8:
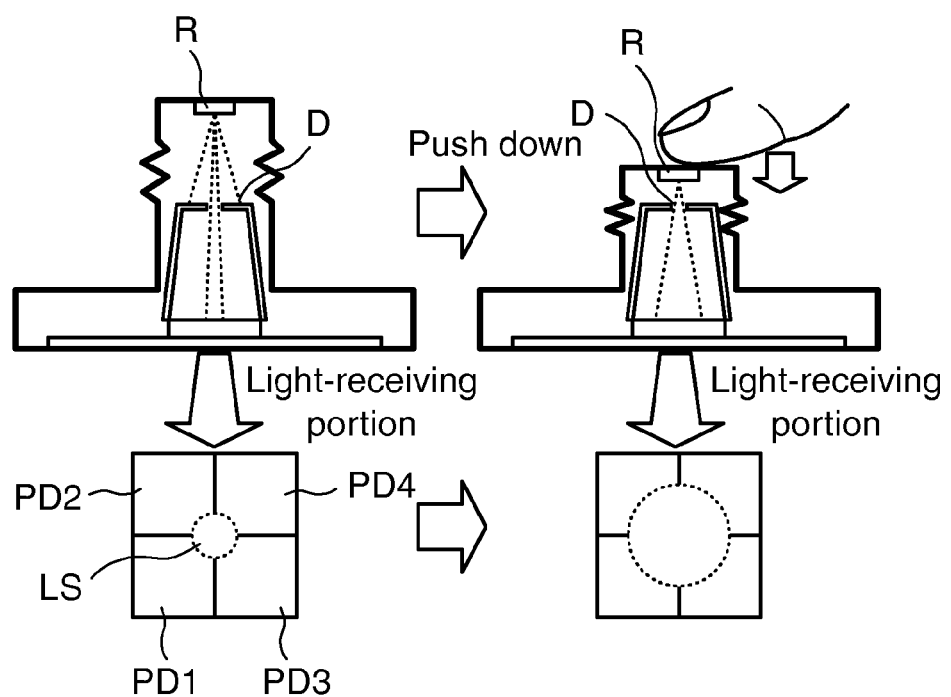
FIG. 8 shows the operation of a conventional input device for obtaining the click function.
Figure 9B:
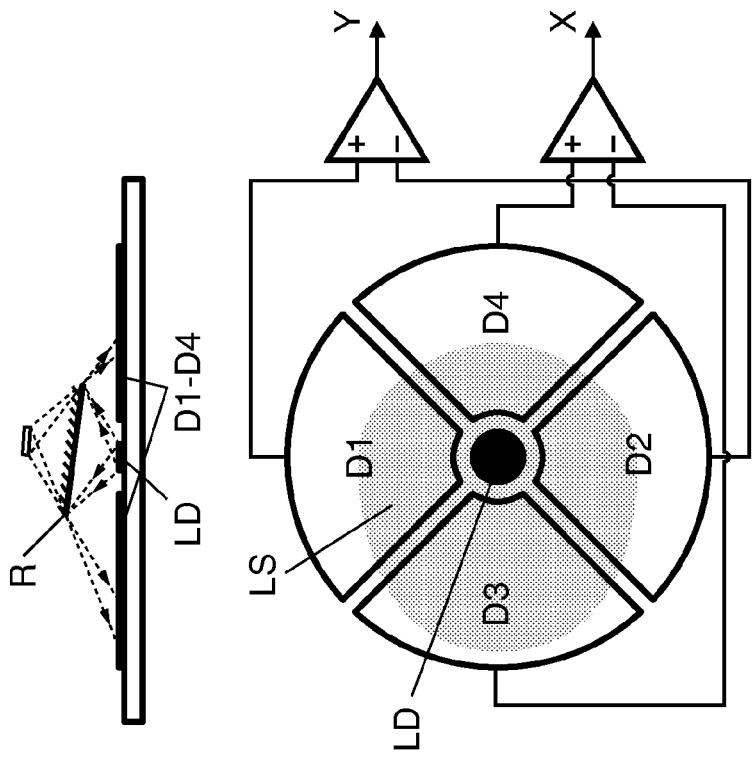
FIG. 9 shows a further conventional arrangement of plural light receiving elements and a light emitting element in conjunciton with the movement and deformation of the light spot.
Figure 9A:
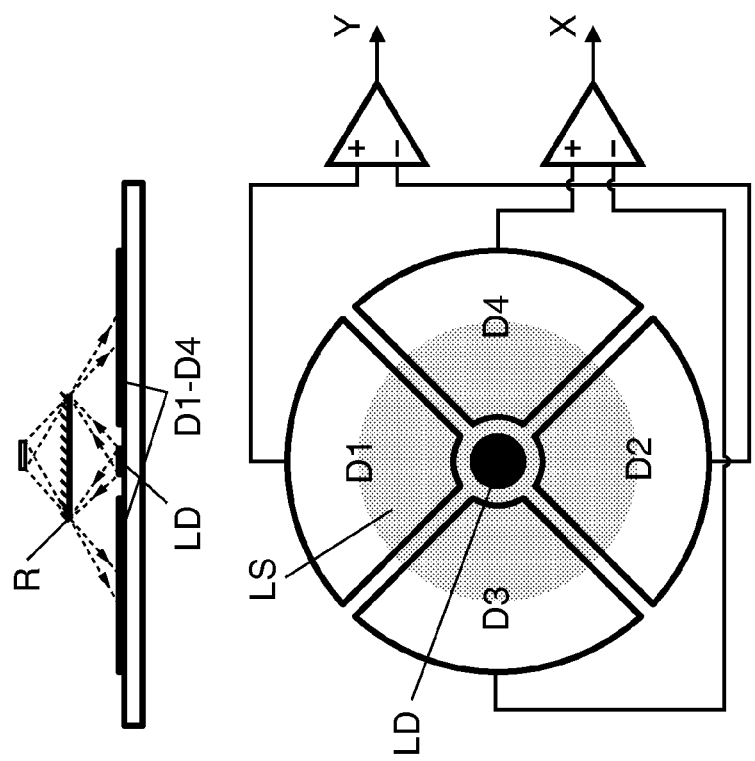

FIG. 5 shows the calculated irradiance profiles of the released position and the click positions. Specifically, the irradiance profile of the released position is depicted in FIG. 5 by a continuous line, whereas the irradiance profile of the click position is depicted by a dashed line. Basically, the irradiance profiles shown in FIG. 5 correspond to the considerations of the irradiation profiles shown in FIG. 4.

As can be seen from the context of FIG. 5, on both detectors (for example detectors D3 and D4) the irradiance is increased with the same amount. The detection signals in conjunction with the Z detection are subject to a specific processing, and based on the same set of the plural detectors D1 to D4, the X and Y signals can still be separated from the Z signal. It is also possible to use separate detectors for the Z detection.

Regarding the detection concept of the detection system (joystick) according to the present invention, preferably based on the optical joystick 1, it is in summary to be noted that the size (dimension) of the reflecting unit 5 as well as the distance between the light source S and the reflecting unit 5, and further the dimensions of the plurality of detectors D1 to D4 and their distribution on the substrate 10 are according to the above description selected in such a manner that the detectors (photo-sensitive light receiving elements) totally lie inside the light spot caused on the substrate 10 by light emitted by the light source S and being reflected by the reflecting unit 5. In both cases, i.e. when the knob 14 of the joystick 1 is in both the rest position or is tilted with a certain tilt angle or with the maximum tilt angle, the plural detectors lie completely within the light spot 16 or 16'. That is, the plurality of detectors D1 to D4 is always fully covered with the light spot 16 or 16' irrespective of whether the knob 14 and, thus, the reflecting unit 5 is tilted to the designed maximum angle or not.

Moreover, the click function which corresponds to the detection in the Z direction (Z axis) can be performed by means of the same arrangement of light source S, reflecting unit 5 and the plurality of detectors D1 to D4 which are used for the detection in the X and Y directions. No further detection elements or any additional components specifically for the Z detection are necessary.

This is advantageous in view of the size of the detection system in the form of the joystick 1 according to the present invention, and it is possible to minimize the area used for the plurality of detectors D1 to D4 and the light source S, so that the joystick 1 can be miniaturized and can be made suitable for further use in very small devices and applications.

This is in clear contrast to the X and Y detection principle as described in the above-mentioned references, this principle being based on the change in the detector signals due to the change in the light coverage on the areas of the detectors. In the references, the dimensions of the detectors and the other geometry must be arranged so that during the operation the boundary of the light spot should sweep across the detector areas. This results in a disadvantage that the detector areas cannot be easily made small, resulting in that the total area of the substrate becomes large. Regarding the Z detection, it is proposed in the references to use a further separately arranged set of detectors or to use further components, such as a aperture, to obtain suitable detection conditions for the Z detection. Specifically, the detection is based on the change in the size of the light spot.

Figure 10:
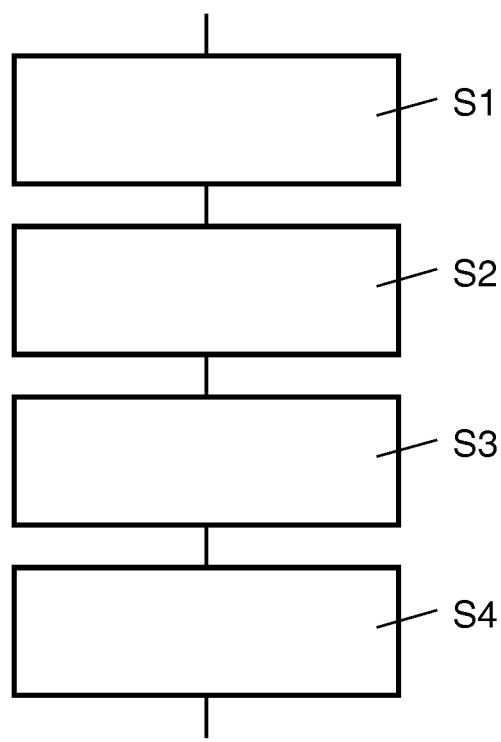
FIG. 10 shows a flow chart of the method steps of detecting movements of the movable object.

FIG. 10 shows a flow chart of a corresponding method of detecting movements of the movable object of the system according to the present invention.

In this flow chart of FIG. 10 a first step S1 concerns emitting light to the reflecting unit 5. Reflecting the emitted light by the reflecting unit 5 being arranged in functional connection with the movable object is being performed according to a second step S2. In a third step S3 a light spot 16 or 16' is caused to be incident on the plurality of detectors D1, D2, D3, D4 being arranged in a predetermined manner to be located completely inside the light spot irrespective of any movement of the movable object, and according to a fourth step S4 the reflected light is detected and detection signals for determining the movements of the movable object are output.

The method of detecting movements of the movable object exhibits the same advantages as the detection system described above.

The detection system according to the present invention can be applied to any mobile devices, and in particular battery-driven devices, such as mobile phones, and the circuitry shown in FIG. 1 may form part of the complete portable device or any further apparatus wherein the detection system is incorporated.

The detection system may also be provided as an external device basically covering the circuitry shown in FIG. 1. In this case, the controller 8 having the function of a data evaluation and control means also provides an interface function for connection to a further device or apparatus the display of which is to be controlled (specifically regarding cursor movement and selection function). The detection device in this case does not form part of the device or apparatus to be controlled, but forms an external device being connected to the device or apparatus to be controlled.

The detection system such as the joystick 1 according to the present invention may also be used to detect any kind of small movement in any stationary or portable device and apparatus, provided that such a movement can be coupled to the movable object (knob 14), resulting in a movement of the knob 14 which can reliably be detected.

While the present invention has been illustrated and described in detail in the drawings and the foregoing descriptions, such illustrations and descriptions are to be considered illustrative or exemplary and not restrictive, and the present invention is not limited to the disclosed embodiments. Specifically the dimensions of the detectors and the light source is not confined to the proportions shown in the Figures and not limited to a joystick. The skilled person will consider many applications of the detection system in practice without departing from the detection concept and described components of the present invention while the performance of the invention is ensured.

Other variations to the disclosed embodiments can be understood and effected by those skilled in the art in practicing the claimed invention, from a study of the drawings, the disclosure and the appended claims in which the reference signs are not to be interpreted as limiting the scope of the present invention.

The invention claimed is:

1. Detection system for a detection of movements of a movable object, said system comprising:
   a light emitting device for emitting light,
   a reflecting unit being arranged in functional connection with said movable object and being adapted for reflecting said emitted light,
   a plurality of detectors for detecting an irradiance of said reflected light and outputting detection signals in response to the irradiance for determining a movement of said movable object, wherein
   said reflecting unit, when reflecting said emitted light, causes a light spot to be incident on said plurality of detectors, and
   said plurality of detectors being arranged in a predetermined manner to be located completely inside said light spot irrespective of any movement of said movable object.

2. Detection system according to claim 1, wherein said plural detectors are symmetrically arranged around said light emitting device, and said reflecting unit being arranged with a predetermined distance above said light emitting device and being adapted for directing said light spot to each of said plurality of detectors.

3. Detection system according to claim 1, wherein said plural detectors and said light emitting device are arranged in or at a substrate, and said reflecting unit being adapted for causing said light spot to be incident on a predetermined area on said substrate covering said plurality of detectors.

4. Detection system according to claim 3, wherein said movable object is a knob being elastically supported for a tilt or linear movement, said tilt or linear movement causing a variation of the irradiance on said plural detectors while said predetermined area on said substrate is maintained.

5. Detection system according to claim 1, wherein said detection signals of said plurality of detectors are communicated to a plurality of processing units for obtaining signals indicative of the movement of said movable object based on said variation of said irradiance on said plurality of detectors.

6. Detection system according to claim 1, wherein said plurality of detectors includes a first subset of detectors for the detection of a tilt movement of said movable object in a first direction, and a second subset of detectors for the detection of a tilt movement of said movable object in a second direction, and the detection of the tilt movement of said movable object being performed based on a difference in the irradiance of the reflected light on the detectors within each subset of detectors.

7. Detection system according to claim 6, wherein said movement of said movable object includes a linear movement in a third direction perpendicular to said first and said second directions, and said linear movement of said movable object in said third direction being detected based on the output signals of at least one of the first and the second subsets of detectors.

8. Detection system according to claim 1, wherein said light emitting device and said plurality of detectors are integrated on a substrate.

9. Detection system according to claim 1, wherein said movement of said movable object being determined depending upon a variation in the irradiance of said reflected light within said light spot on said plurality of detectors.

10. Detection system according to claim 1, wherein said light spot of said reflected light includes a predetermined irradiance profile, and the determination of said movement of said movable object being based on an asymmetry of said irradiance profile of said light spot on said plurality of detectors due to said movement.

11. Detection system according to claim 8, wherein said light emitting device is located at the center of said substrate and said plural detectors are located symmetrically around said light emitting device.

12. Detection system according to claim 5, wherein said processing units include differential circuits for detecting differences in said output signals of said plurality of detectors and are adapted for outputting a differential signal indicative of said movement of the movable object.

13. Detection system according to claim 1, wherein said light spot of said reflected light has an outline shape according to one of a circular area, a square and a square with rounded corners.

14. Detection system according to claim 7, wherein said movement of said movable object in said third direction being determined depending upon a variation in the irradiance of said reflected light within said light spot on at least one of the first and the second subsets of detectors.

15. Integrated circuit having implemented therein a detection system for detecting the movements of a movable object according to claim 1.

16. Method of detecting movements of a movable object of a detection system, said method comprising the steps of:
   emitting light to a reflecting unit,
   reflecting said emitted light by said reflecting unit being arranged in functional connection with said movable object,
   causing a light spot to be incident on a plurality of detectors being arranged in a predetermined manner to be located completely inside said light spot irrespective of any movement of said movable object, and
   detecting an irradiance of said reflected light and outputting detection signals in response to the irradiance for determining the movements of said movable object.

* * * * *